(12) United States Patent
Jeon

(10) Patent No.: US 11,827,151 B2
(45) Date of Patent: Nov. 28, 2023

(54) LATERAL IMAGE PROCESSING APPARATUS AND METHOD OF MIRRORLESS CAR

(71) Applicant: Hyundai Mobis Co., Ltd., Seoul (KR)

(72) Inventor: Seung Heon Jeon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/869,745

(22) Filed: Jul. 20, 2022

(65) Prior Publication Data
US 2023/0021116 A1    Jan. 19, 2023

Related U.S. Application Data

(63) Continuation of application No. 16/503,900, filed on Jul. 5, 2019, now Pat. No. 11,420,561.

(30) Foreign Application Priority Data

Jul. 6, 2018 (KR) .......................... 10-2018-0078820

(51) Int. Cl.
*B60R 1/00* (2022.01)

(52) U.S. Cl.
CPC .......... *B60R 1/00* (2013.01); *B60R 2300/306* (2013.01); *B60R 2300/8046* (2013.01)

(58) Field of Classification Search
CPC ................ B60R 1/00; B60R 2300/306; B60R 2300/8046; B60R 2300/307; B60R 2300/30; B60R 2300/8066; B60R 2300/202; B60R 2300/205; B60R 2300/00; B60R 2300/8093; B60R 2300/8033; B60R 2300/70; B60R 2300/80; B60R 2300/802; B60R 11/04; B60R 2001/1215; B60R 11/0235; B60R 2011/0276; B60K 2370/176; B60K 2370/1868; B60K 2370/21; B60K 2370/52; B60K 2370/797; B60K 35/00; B60K 2370/152; B60K 2370/1526; B60K 2370/1529;
(Continued)

(56) References Cited

U.S. PATENT DOCUMENTS 6,985,075 B2 * 1/2006 Takeda ................... G08G 1/167
                                                                          348/148
2006/0274147 A1   12/2006 Chinomi et al.
(Continued)

FOREIGN PATENT DOCUMENTS

KR   10-2017-0124212    11/2017

OTHER PUBLICATIONS

Non-Final Office Action dated Nov. 2, 2021, in U.S. Appl. No. 16/503,900.
(Continued)

*Primary Examiner* — Nathnael Aynalem
(74) *Attorney, Agent, or Firm* — H.C. Park & Associates, PLC

(57) ABSTRACT

The present invention relates to a lateral image processing method, and the method includes recognizing areas in which amounts of image change are different from each other in an image captured by a camera; determining whether a car is in a driving state; and converting an image in one area in which an amount of image change is different according to the driving state of the car.

10 Claims, 5 Drawing Sheets

(58) Field of Classification Search
CPC .... B60K 2370/1531; B60K 2370/1533; B60K 2370/736; B60K 2370/739; H04N 7/181
USPC .......................................................... 348/148
See application file for complete search history.

(56) References Cited

U.S. PATENT DOCUMENTS

| | | | |
|---|---|---|---|
| 2012/0002051 A1* | 1/2012 | Nix ...................... | G06V 20/597 348/148 |
| 2012/0320212 A1 | 12/2012 | Aimura et al. | |
| 2013/0004021 A1 | 1/2013 | Nagaoka et al. | |
| 2013/0194295 A1* | 8/2013 | Chan ...................... | G09G 5/395 345/204 |
| 2013/0271608 A1* | 10/2013 | Hiei ........................ | H04N 7/18 348/148 |
| 2014/0055573 A1* | 2/2014 | Lee .......................... | G06T 7/70 348/47 |
| 2017/0318267 A1 | 11/2017 | Kim et al. | |

OTHER PUBLICATIONS

Notice of Allowance dated Apr. 20, 2022, in U.S. Appl. No. 16/503,900.

* cited by examiner

LATERAL IMAGE PROCESSING APPARATUS AND METHOD OF MIRRORLESS CAR

CROSS-REFERENCE TO RELATED APPLICATION

The present application is a continuation of U.S. Patent Application Ser. No. 16/503,900, filed on Jul. 5, 2019, which claims priority from and the benefit of Korean Patent Application No. 10-2018-0078820, filed on Jul. 6, 2018, each of which is incorporated by reference for all purposes as if fully set forth herein.

BACKGROUND

Field

Exemplary embodiments relates to a lateral image processing apparatus and method of a mirrorless car, and more specifically, to an image processing apparatus and method of easily recognizing a car in a short time period even with a display apparatus having a limited size by enhancing clarity of the car in an image captured by a camera.

Discussion of the Background

In a car technology, desires for a technology for self-driving, a technology for improving fuel efficiency of a car, and car design are increased.

In order to meet such desires, mirrorless cars in which cameras and display apparatuses are substituted for car side mirrors are developed, and laws and regulations for the mirrorless cars, which do not include side mirrors, of each country are being revised.

Such a mirrorless car displays an image received from a camera on a display apparatus, but there is a problem in that it is not easy to recognize an object in the displayed image due to a limited size of the display apparatus.

In addition, in a case in which an image received from a camera is generally dark or bright, or is partially bright or dark, a conventional mirrorless car has a problem in that risk of an accident is increased because it is difficult to recognize an object due to light and dark distribution in the image.

The above information disclosed in this Background section is only for enhancement of understanding of the background of the invention and, therefore, it may contain information that does not constitute prior art.

SUMMARY

Exemplary embodiments of the present invention is directed to providing a lateral image processing apparatus of a mirrorless car capable of reducing risk of an accident by recognizing a car in an image captured by a camera and differentiating clarity of the recognized car from a background to easily recognize the car in a short time period even in a display apparatus with a limited size, and a lateral image processing method. Objects of the present invention are not limited to the above described objects, and other objects, which are not described above, of the present invention may be clearly understood by the following descriptions.

According to an aspect of the present invention, there is provided a lateral image processing method of a mirrorless car, the method including: recognizing areas in which amounts of image change are different from each other in an image captured by a camera; determining whether a car is in a driving state; and converting an image in one area in which an amount of image change is different according to the driving state of the car.

The method may further include adjusting clarity of an image area in which an amount of image change is large in the captured image when the car is in the driving state.

Conversely, the method may further include adjusting clarity of an image area in which an amount of image change is small in the captured image when the car is in a stopped state, The converting of the one image in the one area may include converting the one image such that clarity of one corresponding image area is reduced.

In addition, according to another aspect of the present invention, there is provided a lateral image processing method of a mirrorless car, the method further including: determining whether a rear and lateral car is recognized by a rear and lateral warning apparatus; and emphasizing a boundary line between an area in which an amount of image change is large and an area in which an amount of image change is small in the captured image when the rear and lateral car is recognized.

According to still another aspect of the present invention, there is provided a lateral image processing apparatus of a mirrorless car, the apparatus including: an image capturer configured to capture an image in a lateral and rear direction of the car; an object recognizer configured to recognize areas in which amounts of image change are different from each other in the captured image; a driving state determination unit configured to determine a driving state of the car from a provided car speed; and an image processor configured to convert an image of one area recognized in the captured image according to the driving state of the car.

The image processor may adjust clarity of an image area in which an amount of image change is large in the captured image when the car is in the driving state, and may adjust clarity of an image area in which an amount of image change is small in the captured image when the car is in a stopped state.

The image processor may convert the image such that clarity of one corresponding image area is reduced.

Meanwhile, according to yet another aspect of the present invention, there is provided a lateral image processing apparatus of a mirrorless car, the apparatus further including a lateral and rear warning determination unit configured to determine whether a rear and lateral car is recognized by a rear and lateral warning apparatus, wherein the image processor may emphasize a boundary line between an area in which an amount of image change is large and an area in which an amount of image change is small in the captured image when the rear and lateral car is recognized.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Advantages and features of the present invention and methods of achieving the same will be clearly understood with reference to the following detailed embodiments along with the accompanying drawings. However, the present invention is not limited to the examples to be disclosed below, but may be implemented in various different forms. The examples are provided in order to fully explain the present invention and fully explain the scope of the present invention for those skilled in the art. The scope of the present invention is defined by the appended claims. Meanwhile, the terms used herein are provided to only describe embodiments of the present invention and not for purposes of limitation. Unless the context clearly indicates otherwise, the singular forms include the plural forms. It will be understood that the terms "comprise" or "comprising" when used herein, specify some stated components, steps, operations and/or elements, but do not preclude the presence or addition of one or more other components, steps, operations and/or elements.

Figure 1:
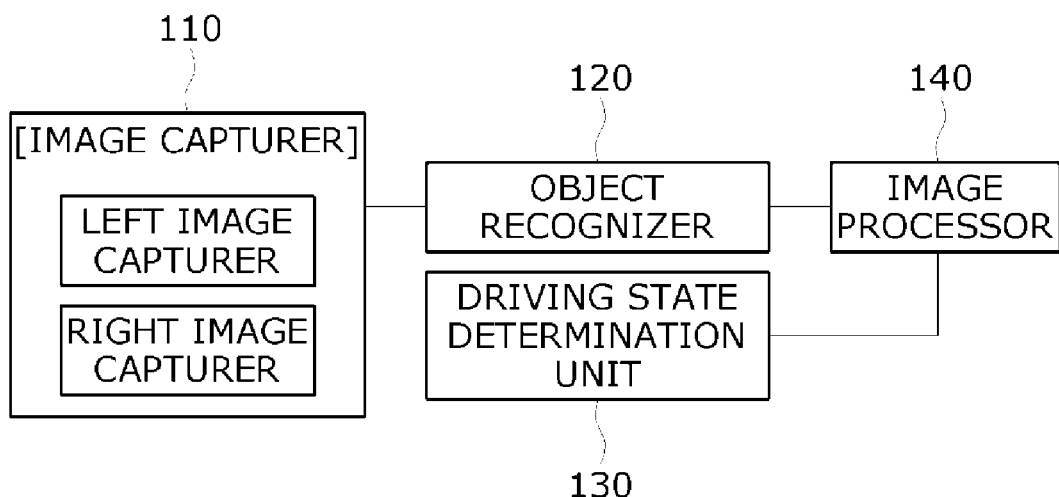
FIG. 1 is a functional block diagram for describing a lateral image processing apparatus of a mirrorless car according to one embodiment of the present invention.

Hereinafter, exemplary embodiments of the present invention will be described with reference to the accompanying drawings in detail. As illustrated in FIG. 1, a lateral image processing apparatus of a mirrorless car according to one embodiment of the present invention includes image capturers 110, an object recognizer 120, a driving state determination unit 130, and an image processor 140.

The image capturers 110 are installed at regions in which car side mirrors are positioned, and serve to capture lateral and rear images.

In addition, the object recognizer 120 serves to recognize areas in which amounts of image change are different from each other.

Figure 2:
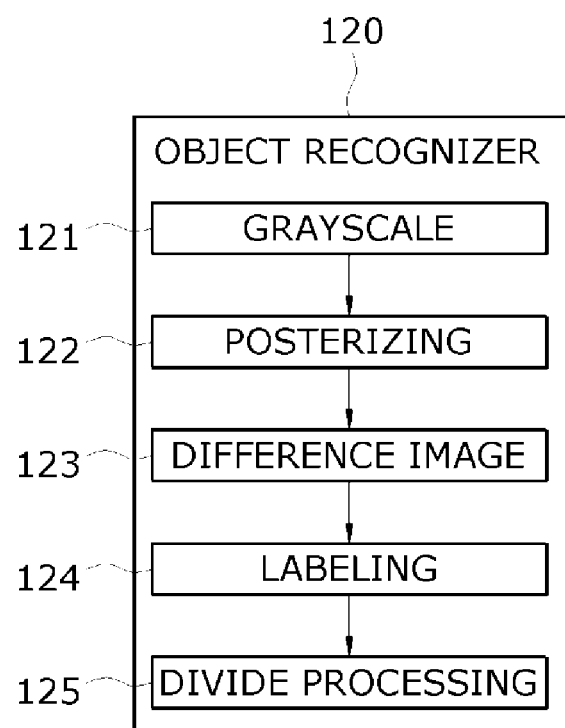
FIG. 2 is a functional block diagram for describing an object recognizer according to one embodiment of the present invention.

Meanwhile, as illustrated in FIG. 2, the object recognizer 120 performs grayscale processing 121 of converting a color image to a black-and-white image, and performs posterizing processing 122 of standardizing by reducing a range of a value that a pixel may have. When a captured image is not a color image, the grayscale processing 121 may not be performed.

Then, the object recognizer 120 performs difference image processing 123 of emphasizing a changed image area, performs labeling processing 124 of analyzing a shape of the image area, and performs dividing processing 125 of dividing an area in which an amount of image change is large from an area in which an amount of image change is small.

Figure 3A:
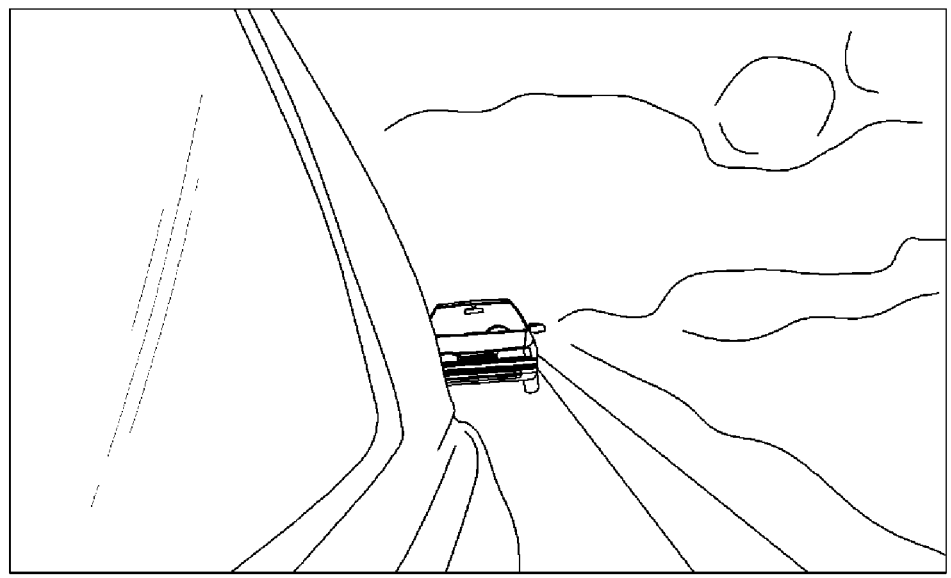
FIGS. 3A, 3B, 3C, and FIG. 3D are reference views for describing an image processor according to one embodiment of the present invention.
Figure 3B:
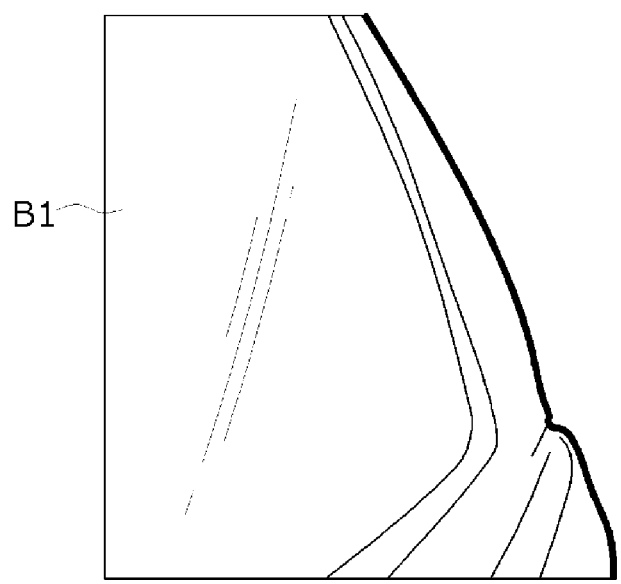

Accordingly, as illustrated in FIG. 3B, the object recognizer 120 may divide an unchanged lateral image B1 of a host car, a background image B2 when the car is driving or stopped, and a rear and lateral car image B3.

Figure 3C:
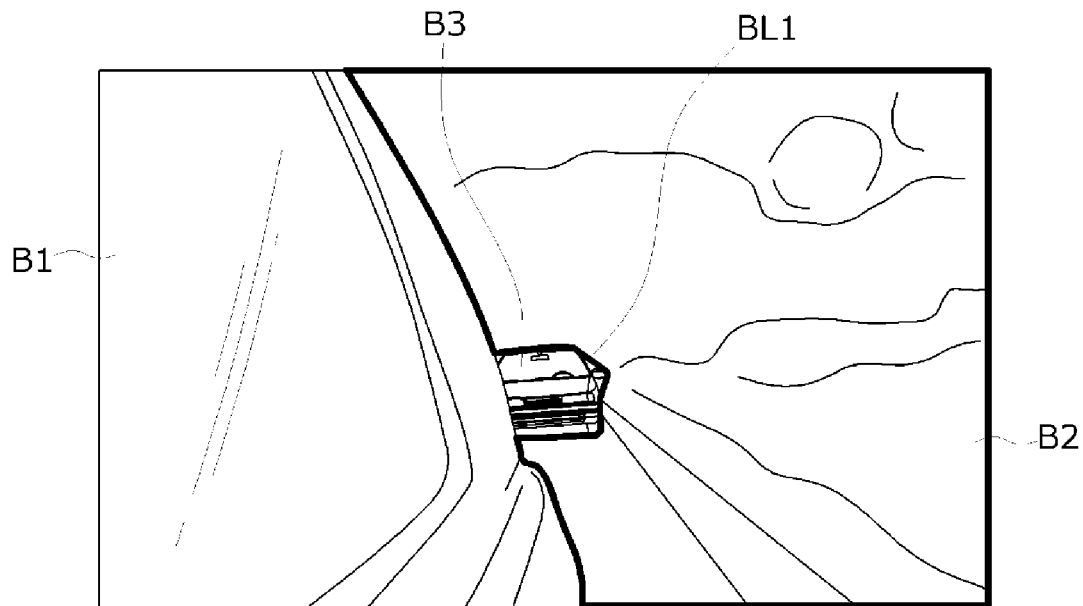

At this moment, as illustrated in FIG. 3C, the object recognizer 120 may determine a basic host car area B1 as a basic host car image, and exclude the basic host car area B1 from the image.

Meanwhile, the driving state determination unit 130 serves to determine a driving state of the car from a provided car speed. In this case, speed information provided by a speed meter of the car may be used as the car speed.

In addition, the image processor 140 serves to convert an image of one area recognized in the captured image according to the driving state of the car.

For example, when the car is in the driving state, the image processor 140 adjusts clarity of an image area in which an amount of image change is large in the captured image. In the present embodiment, a method of reducing clarity of a corresponding area may be used.

Conversely, when the car is in a stopped state, the image processor 140 adjusts clarity of an image area in which an amount of image change is small.

Accordingly, according to one embodiment of the present invention, there is an effect of reducing risk of an accident during travel by processing a background in an image captured by a camera to be dimmed to improve visibility of a target car on a limited display apparatus according to a driving state.

Figure 4:
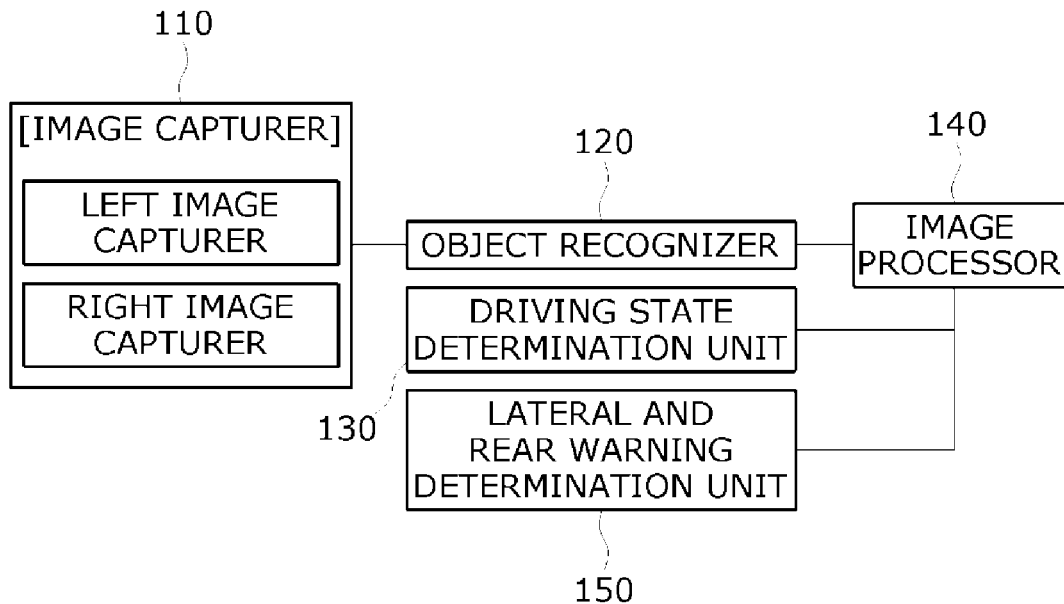
FIG. 4 is a functional block diagram for describing a lateral image processing apparatus of a mirrorless car according to another embodiment of the present invention.

Meanwhile, FIG. 4 is a functional block diagram for describing a lateral image processing apparatus of a mirrorless car according to another embodiment of the present invention.

According to another embodiment of the present invention, as illustrated in FIG. 4, the lateral image processing apparatus of a mirrorless car includes a camera, an object recognizer 120, a driving state determination unit 130, and an image processor 140 according to one embodiment, and further includes a lateral and rear warning determination unit 150 configured to determine whether a rear and lateral car is recognized by a rear and lateral warning apparatus.

When a rear and lateral car is recognized by the lateral and rear warning determination unit 150, the image processor 140 according to another embodiment of the present invention may emphasize a boundary line between an area in which an amount of image change is large and an area in which an amount of image change is small in a captured image.

Accordingly, the object recognizer 120 may display a boundary area having risk of crashing by considering areas in which shapes are analyzed through labeling in conjunction with the lateral and rear warning determination unit 150.

For example, an image capturer 110 provided at a side of the car captures a rear and lateral image from a car. Then, the object recognizer 120 may obtain an image as illustrated in FIG. 3A.

The object recognizer 120 recognizes a basic host car area B1 as a basis from the obtained image as illustrated in FIG. 3B.

Then, when a lateral and rear car is recognized by the lateral and rear warning determination unit 150, the object recognizer 120 excludes the basic host car area B1 from the captured image, and emphasizes a boundary area BL1 in which a shape is analyzed as illustrated in FIG. 3C.

Figure 3D:
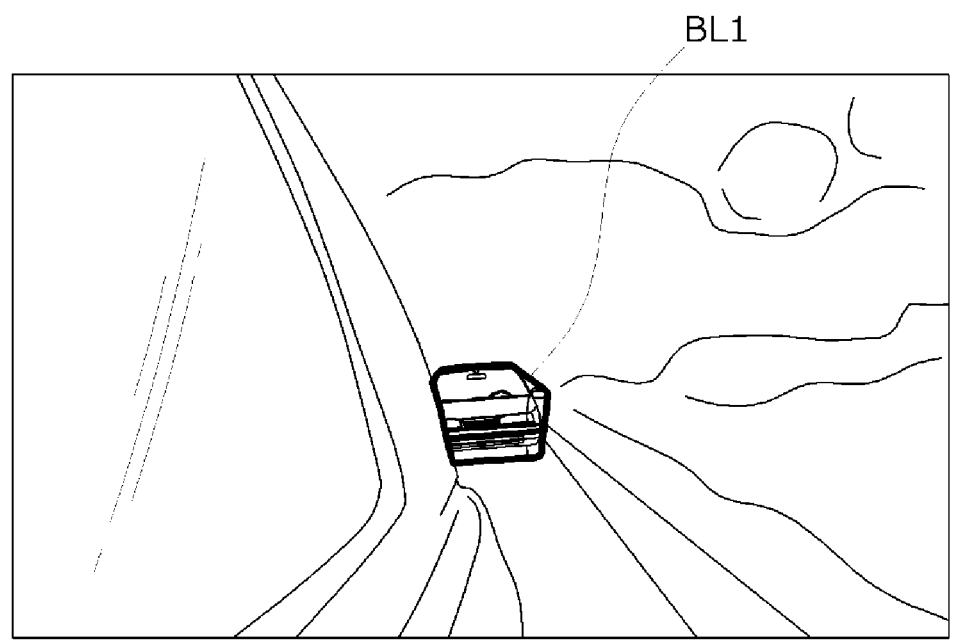

Then, when a rear car or a rear and lateral car is recognized by the lateral and rear warning determination unit 150, the image processor 140 displays an image including the boundary area BL1 emphasized by the object recognizer 120 on a display apparatus as illustrated in FIG. 3D.

Figure 5:
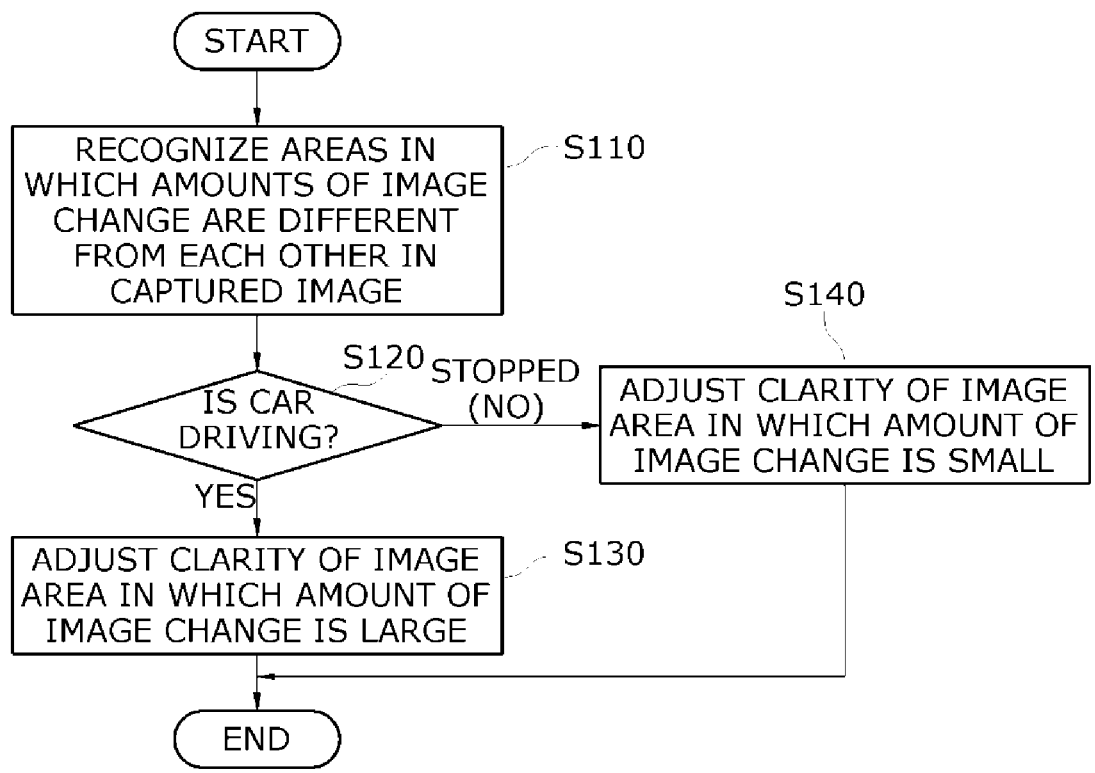
FIG. 5 is a flowchart for describing a lateral image processing method of a mirrorless car according to one embodiment of the present invention.

A lateral image processing method of a mirrorless car according to one embodiment of the present invention will be described with reference to FIG. 5.

First, areas in which amounts of image change are different from each other are recognized in an image captured by a camera (S110).

Then, a driving state of a car is determined (S120).

Then, clarity of one image area in which an amount of image change is different is converted according to the driving state of the car. That is, when the car is in the driving state (YES), clarity of an image area in which an amount of image change is large is adjusted in the captured image. When the car is traveling, an amount of image change of a background is greater than that of a car positioned in a lateral and rear direction. Accordingly, an image, in which the amount of image change is small, of the lateral and rear car is sharpened by reducing image clarity of the background area in the image.

Conversely, when the car is in a stopped state (NO), clarity of an image area in which an amount of image change is small is adjusted in the captured image (S140). That is, in the state in which the car is stopped, since an amount of image change of a background image area is less than an amount of image change of a rear and lateral car, an image of the rear and lateral car may be sharpened by reducing the clarity of the image area in which the amount of image change is small.

According to one embodiment of the present invention, additional image processing may be performed according to presence of a rear and lateral car.

To this end, it is determined whether a car is present in a rear and lateral direction.

When a car is present in the rear and lateral direction (YES), a boundary line between an image area in which an amount of image change is large and an image area in which an amount of image change is small is emphasized in a captured image.

Figure 6:
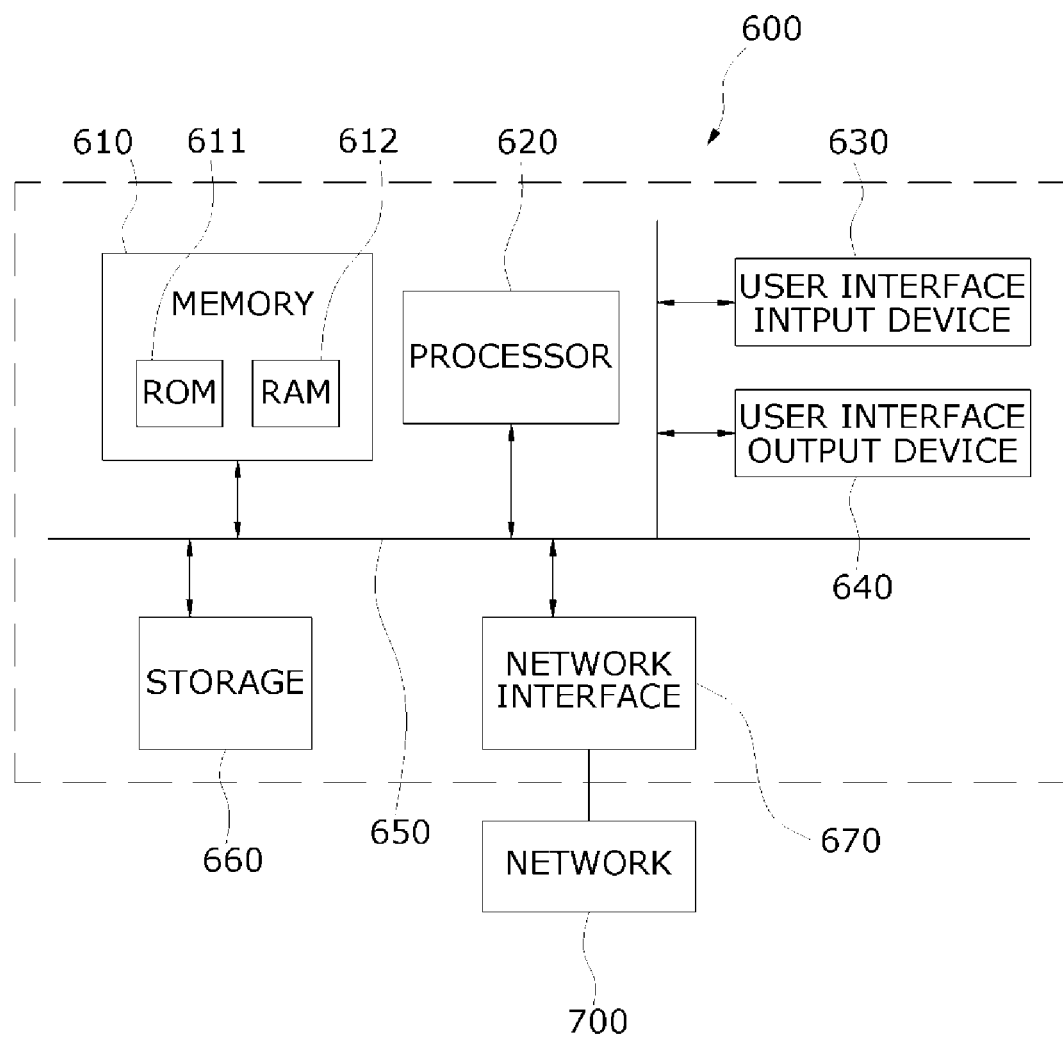
FIG. 6 is a block diagram illustrating a computer system to which the present invention is applied.

FIG. 6 is a block diagram illustrating a computer system to which the present invention is applied.

As shown in FIG. 6, a computer system 600 may include one or more of a memory 610, a processor 620, a user input device 630, a user output device 640, and a storage 660, each of which communicates through a bus 650. The computer system 600 may also include a network interface 670 that is coupled to a network 700. The processor 620 may be a central processing unit (CPU) or a semiconductor device that executes processing instruction stored in the memory 610 and/or the storage 660. The memory 610 and the storage 660 may include various forms of volatile or non-volatile storage media. For example, the memory 610 may include a read-only memory (ROM) 611 and a random access memory (RAM) 612.

According to one embodiment, there is an effect in that it is emphasized and displayed on the display apparatus that the car is present in the rear and lateral direction through the above-described operation in which the boundary line of the image areas is emphasized.

As described above, according to one embodiment of the present invention, there is an effect of reducing risk of an accident during travel by processing a background to be dimmed in an image captured by a camera to improve visibility for a car which should be recognized in a limited display apparatus.

As described above, the configuration of the present invention has been described with reference to the accompanying drawings, but is only an example, and various modifications and alterations may also be made within a range of a technical sprit of the present invention by those skilled in the art. Accordingly, the scope of the invention is not limited by the above-described embodiments, and is defined by the appended claims.

What is claimed is:

1. A lateral image processing method of a mirrorless vehicle, the method comprising the steps of:
   capturing, by a camera, an image in a lateral and rear direction of the mirrorless vehicle;
   performing a difference image processing and a labeling processing to obtain amounts of image change in the captured image;
   recognizing a plurality of areas in the captured image based on the amounts of the image change in the captured image;
   determining a target area from the plurality of areas differently according to whether the mirrorless vehicle is in one of a driving state and a stopped state; and
   converting the determined target area, wherein:
   the plurality of areas comprise first and second areas defined by a difference in the amounts of the image change of the first and second areas;
   the determining the target area comprises determining the target area as the first area having a larger amount of the image change than the second area when the mirrorless vehicle is in the driving state;
   the plurality of areas further comprise a third area of which the amounts of the image change are zero; and
   the method further comprises excluding the third area from the captured image, wherein the third area includes a body of the mirrorless vehicle.

2. The method of claim 1, wherein:
   the difference image processing comprises emphasizing a changed image area in the captured image; and
   the labeling processing comprises analyzing a shape of the changed image area.

3. The method of claim 1, wherein the determining the target area further comprises determining the target area as the first area having smaller amounts of the image change than the second area when the mirrorless vehicle is in a stopped state.

4. The method of claim 1, wherein the converting the target area comprises reducing clarity of the first area to improve visibility of the second area.

5. The method of claim 1, further comprising emphasizing a boundary line between the first area and the second area.

6. A lateral image processing apparatus of a mirrorless vehicle, the apparatus comprising:
   an image capturer configured to capture an image in a lateral and rear direction of the mirrorless vehicle;
   a recognizer configured to perform a difference image processing and a labeling processing to obtain amounts of image change in the captured image, and to recognize a plurality of areas in the captured image based on the amounts of the image change in the captured image; and
   an image processor configured to determine a target area from the plurality of areas differently according to whether the mirrorless vehicle is in one of a driving state and a stopped state, and to convert the determined target area,
   wherein:
   the plurality of areas comprise first and second areas defined by a difference in the amounts of the image change of the first and second areas; and
   the image processor is configured to determine the target area as the first area having larger amounts of the image change than the second area when the mirrorless vehicle is in the driving state;

the plurality of areas further comprise a third area of which the amounts of the image change are zero; and the recognizer is configured to exclude the third area from the captured image, wherein the third area includes a body of the mirrorless vehicle.

7. The apparatus of claim 6, wherein:

the difference image processing comprises emphasizing a changed image area in the captured image; and the labeling processing comprises analyzing a shape of the changed image area.

8. The apparatus of claim 6, wherein the image processor is configured to determine the target area as the first area having smaller amounts of the image change than the second area when the mirrorless vehicle is in a stopped state.

9. The apparatus of claim 6, wherein the image processor is configured to reduce clarity of the first area to improve visibility of the second area.

10. The apparatus of claim 6, wherein the image process is configured to emphasize a boundary line between the first area and the second area.

\* \* \* \* \*